United States Patent
Van Herpen

(10) Patent No.: US 6,752,292 B2
(45) Date of Patent: Jun. 22, 2004

(54) CARTRIDGE SET FOR DISPENSING IN-SITU FOAM

(75) Inventor: Goslin Van Herpen, Hardinxveld-Giessendam (DE)

(73) Assignee: illbruck GmbH, Leverkusen (DE)

( * ) Notice: Subject to any disclaimer, the term of this patent is extended or adjusted under 35 U.S.C. 154(b) by 308 days.

(21) Appl. No.: 09/742,267

(22) Filed: Dec. 20, 2000

(65) Prior Publication Data

US 2002/0110499 A1 Aug. 15, 2002

(30) Foreign Application Priority Data

Dec. 6, 2000 (DE) .......................................... 100 60 513

(51) Int. Cl.⁷ ................................................. B67D 5/52
(52) U.S. Cl. ................................... 222/137; 222/145.6
(58) Field of Search .............................. 222/137, 145.1, 222/145.6

(56) References Cited

U.S. PATENT DOCUMENTS 3,625,872 A * 12/1971 Ashida ........................ 521/175
4,538,920 A 9/1985 Drake
5,166,301 A * 11/1992 Jacobs ........................ 528/67

FOREIGN PATENT DOCUMENTS

| DE | 3612377 | 10/1987 |
|---|---|---|
| DE | 3813251 | 11/1989 |
| DE | 4134550 | 4/1993 |
| DE | 9310222 | 11/1994 |
| DE | 19744364 | 4/1998 |
| DE | 19738670 | 3/1999 |
| DE | 19912988 | 8/2000 |

* cited by examiner

Primary Examiner—Philippe Derakshani
(74) Attorney, Agent, or Firm—Martin A. Farber

(57) ABSTRACT

A cartridge set (1) for dispensing in-situ foam, with polyol being contained in one cartridge (2) and isocyanate being contained in another cartridge (3), and with both cartridges (2, 3) opening into a common, elongated mixing nozzle (9), via which foam (S) produced from the substances as components is dispensed, wherein portions (18) of expandable graphite are contained at least in one of the cartridges (2, 3).

12 Claims, 3 Drawing Sheets

CARTRIDGE SET FOR DISPENSING IN-SITU FOAM

FIELD AND BACKGROUND OF THE INVENTION

The invention relates to a cartridge set for dispensing in-situ foam, with polyol being contained in one cartridge and isocyanate being contained in another cartridge, and with both cartridges opening into a common, elongated mixing nozzle, via which foam produced from the said substances as components is dispensed.

Sets designed as twin cartridges are commercially available, as are suitable gun-like dispensing devices. A more syringe-like double cartridge is disclosed by U.S. Pat. No. 4,538,920.

As far as use of the foam is concerned, there is a wide range, from the fitting of door and window frames to the filling of joints.

On the other hand, there are also types of foam strip with a heat-expandable intumescent compound, for example a urea-derivative/ammonium-polyphosphate/polyacetate-based compound. In this respect, reference is made to DE-U 93 10 222.

DE-A 36 12 377 discloses a flameproof sealing strip, likewise with a thermally reactive intumescent additive. The strip is used in the building trade.

Recently, attention has also been paid to the use of expandable graphite as a flame-retardant additive. In the event of a fire, this mineral rapidly assumes up to 280 times its initial volume and smothers the fire.

The expansion of the graphite begins at approximately 200° C. and it attains its greatest space-taking effect at 900° C.

SUMMARY OF THE INVENTION

With knowledge of these given facts, it is an object of the invention to make the said expanding substance available to the building foam sector in a way which is advantageous in terms of dispensing.

This object is achieved initially and substantially in the case of a cartridge set according to the above-mentioned type wherein portions of expandable graphite are contained at least in one of the cartridges. The expanding substance held in readiness in this way makes use of already existing receptacles. Added to this is the use of the mixing nozzle, likewise already provided on the cartridge set. An extremely fine distribution takes place in this nozzle. According to the invention, it is then proposed that the portions of expandable graphite are accommodated in the cartridge containing polyol as an embedding substance. On the other hand, it can also be advantageously provided that the portions of expandable graphite are accommodated in the cartridge containing isocyanate as an embedding substance. Furthermore, it is favourable if the portions of expandable graphite are added to the substances such that they are distributed between the two cartridges. This solution is further characterized by a uniform distribution between the substances of the two cartridges. If—as also proposed—both cartridges have portions of expandable graphite, there is already from the outset as it were a balanced convergence of the portions. The expansion property also much depends on the size of the graphite portions. As has been found, it is suitable for the graphite portions to have a longest extent of approximately 0.1 mm to 0.3 mm. An extent in this respect of 0.15 mm is preferred. Even sometimes coarser flake graphite can still be dispensed by means of the cartridge set, since the outlet nozzle cross-section of the mixing nozzle has a diameter of 2 mm to 5 mm. With this order of magnitude, a satisfactory passage of the mixed substances to be dispensed, of in-situ foam enriched with graphite portions and comprising two components, namely a polyol mixture and modified isocyanate, is obtained. The incorporation of the graphite portions is mechanically assisted further by the length of the mixing nozzle in the region of the mixing zone corresponding to ten to twenty times the diameter of the mixing nozzle tube. The diameter is a good 9 mm, this meaning the clear diameter. With regard to the good distribution of the expanding substance referred to, it is regarded as advantageous for approximately 40 graphite portions to occur on 1 cm$^2$ of surface of the (solidified) foam or like cross-sectional area. As has been found, there is a high degree of effectiveness if the proportion of the graphite in relation to the embedding substance is 10–20%.

BRIEF DESCRIPTION OF THE DRAWINGS

The subject-matter of the invention is explained in more detail below on the basis of exemplary embodiments illustrated in drawings, in which.

DETAILED DESCRIPTION OF THE PREFERRED EMBODIMENTS

Figure 1:
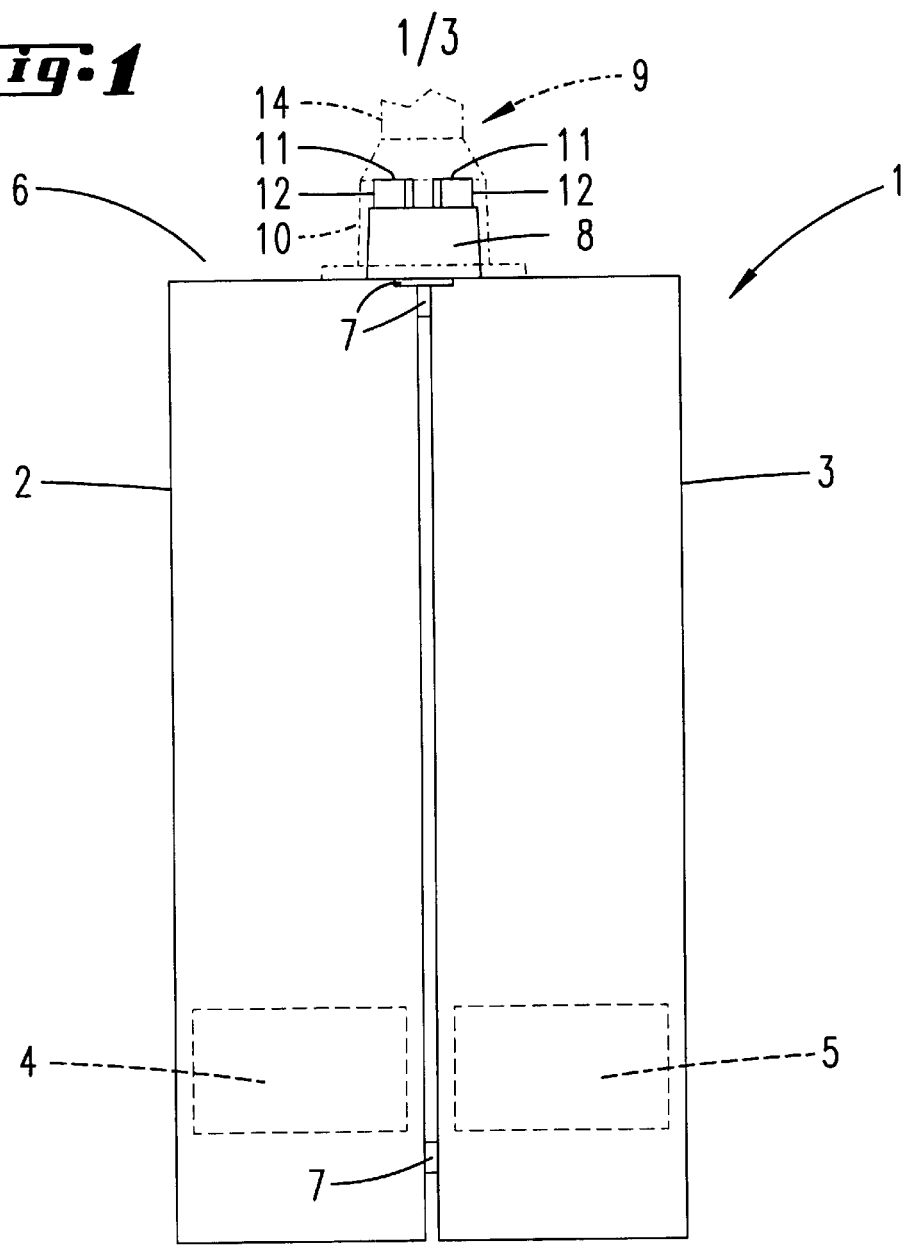
FIG. 1 shows a cartridge set in side view.
Figure 2:
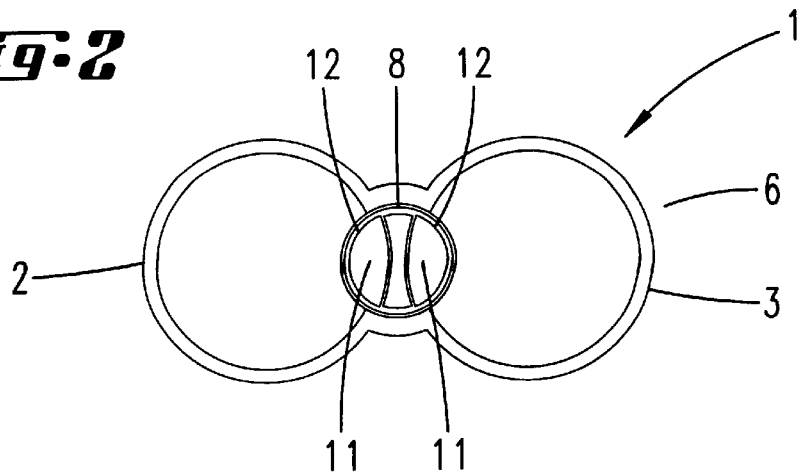
FIG. 2 shows the plan view of this.

The cartridge set 1 represented takes the form of a double cartridge. It comprises separately accommodated components.

One cartridge 2 receives polyol for example. A polyol mixture is in question.

The other cartridge 3 contains modified isocyanate for example.

At the bottom, the cartridges 2, 3 are each provided with a pressing base 4 and 5, respectively. Acting on the rear of the same are rod heads of a dispensing device (not represented). These rod heads, driven in synchronism, displace the pressing bases in such a way that they run parallel in the direction of the cartridge-set dispensing head 6.

The cylindrically shaped cartridges 2, 3, joined together by means of radial bridges 7, merge there, i.e. at the dispensing head 6, into a collecting stub 8. In this collecting stub, the dispensing paths of the substances run together practically in a Y-shaped fork.

Figure 3:
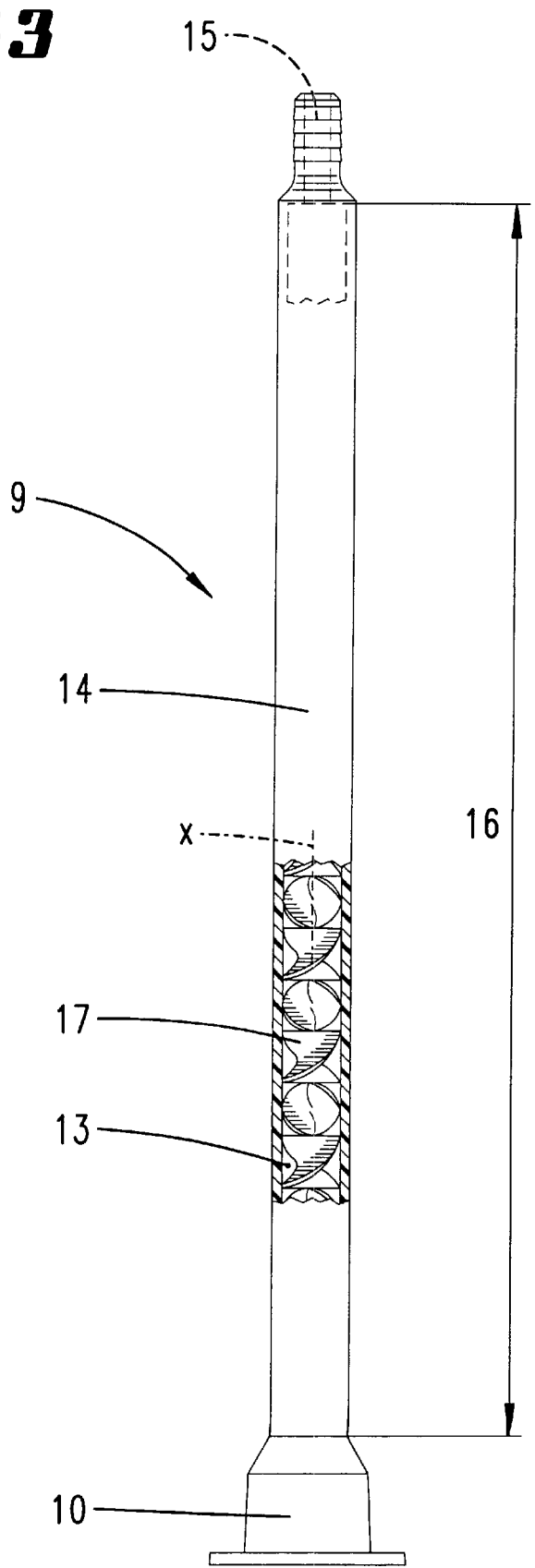
FIG. 3 shows the associated mixing nozzle with outlet nozzle and docking socket, partially broken open, showing a mixing spiral.
Figure 4:
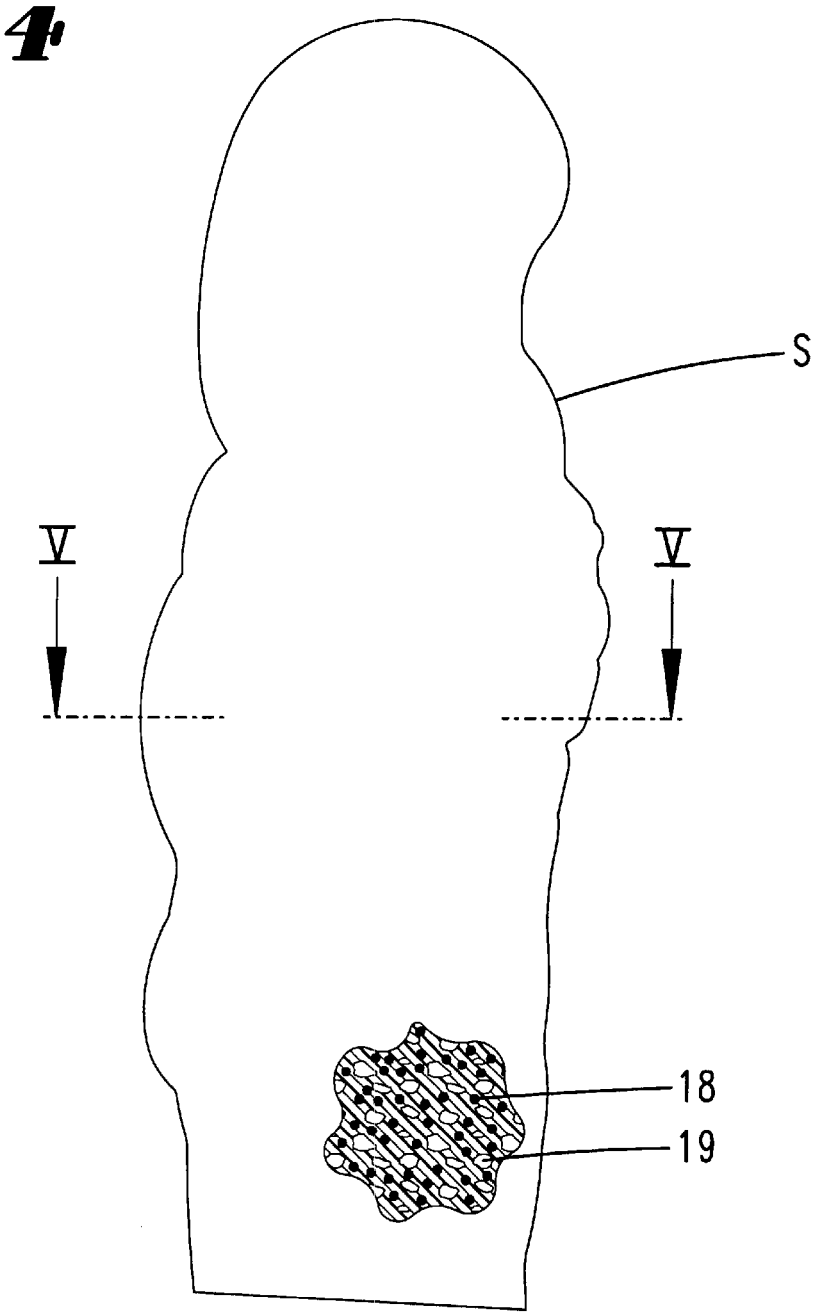
FIG. 4 shows a dispensed bead of foam and FIG. 5 shows the section according to line V—V in FIG. 4.
Figure 5:
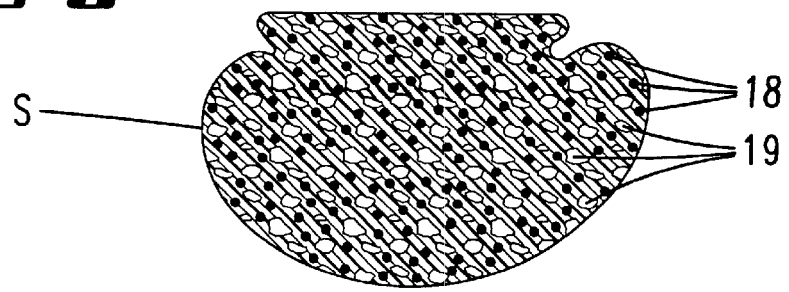

A mixing nozzle 9 can be provided in front of the collecting stub 8. This mixing nozzle 9, shown in FIG. 3, has a docking socket 10 which can be fitted on. The flange of the said docking socket may represent a closure device which interacts with corresponding closure means of the cartridge set 1.

For the aligned arrangement of the mixing nozzle 9, tops 11 of two sickle-shaped stubs 12 have to be cut off. By this means, the substances come into flow connection with the interior 13 of a mixing nozzle tube 14. This tube is of an elongated form.

The mixing nozzle tube 14 is of a considerable length and, in this respect, is larger than the cartridges 2, 3 of the cartridge set 1, formed such that they are the same length as each other.

The end of the mixing nozzle tube 14 remote from the docking socket 10 forms an outlet nozzle 15. This outlet nozzle is significantly constricted in comparison with the clear diameter of the tube 14. The clear diameter of the tube 14 is around 9 mm over the entire mixing zone 16. The outlet nozzle cross-section of the mixing nozzle 9 coaxially adjoining this tube, that is running concentrically with respect to it, is around 2 to 5 mm in diameter. Reference is made to the item in dashed lines in FIG. 3. There, a clear inside diameter of just under 4 mm is depicted.

A spiral 17 extends over the entire length of the mixing zone 16 in the interior 13 of the mixing nozzle tube 14. This spindle-like spiral can be compared to a twisted strip, although the spiral body is interrupted at short intervals in the continuous course of its helix.

The respective new starting point in the spindle core x occurs after an angle-of-rotation offset in each case of 90°. For specific details in this respect, reference is made to U.S. Pat. No. 4,538,920, cited at the beginning. The fixed propeller-like individual mixing bodies are supported by their radially outer, coiled narrow edge against the inside wall of the interior 13.

The length of the mixing nozzle 9 in the region of the mixing zone 16 corresponds to ten to twenty times the clear diameter of the mixing nozzle tube 14.

A thermally reacting expanding substance is associated with either the one cartridge 2 or the other cartridge 3 or both. This expanding substance is mixed uniformly into the substance embedding it.

The substance in question is graphite. The incorporated portions 18 of expandable graphite are indicated in the drawing by black flecks. The lighter flecks symbolize the foam structure of the dispensed foam S, preferably of an open-cell type. The pores are designated by 19. Flake graphite is suitably in question. To obtain a voluminous space-taking effect, the graphite portions 18 are of a longest extent of around 0.1 mm to 0.3 mm. Such smallness makes passing of the outlet nozzle 19 unproblematical.

The mixing zone 16 introduced into the dispensing path produces an excellent distribution of the expandable graphite particles.

It has been found that such a fire-retardant additive is present in adequate density or proximity of individual portions 18 if approximately 40 graphite portions 18 occur on 1 $cm^2$ of surface of the foam S or a like cross-sectional area.

The activation commences at 200° C. and attains its maximum value at approximately 900° C. In this maximum range, up to 280 times the initial volume of the portions 18 is obtained.

Characteristic data of a type of expandable graphite that is used are:

| | |
|---|---|
| purity: | min. 95% |
| expansion volume*: | min. 230 ml/g |
| pH*: | min. 6 |
| free acid*: | max. 1 mg KOH/g |
| $H_2O$ content*: | max. 1.5% |
| ash content*: | max. 5% |
| particle size: | min. 80% > 0.3 mm |

*Determination as specified in GB-10698-89

An expanding graphite of the following characteristic data is also advantageous:

| | |
|---|---|
| purity: | min. 98% |
| expansion volume*: | min. 35 ml/g |
| pH*: | min. 3 |
| $H_2O$ content*: | max. 1% |
| ash content*: | max. 2% |
| particle size: | min. 80% > 0.15 mm |

*Determination as specified in GE-10698-89

The outlet nozzle 15 can be closed by means of a cap (not represented), so that the mixed product as well as its sources are effectively protected during times when dispensing is interrupted and it is not in use.

I claim:

1. Cartridge set (1) for dispensing in-situ foam, with polyol being contained in one cartridge (2) and isocyanate being contained in another cartridge (3), and with both cartridges (2, 3) opening into a common, elongated mixing nozzle (9), via which foam (S) produced from the substances as components is dispensed, wherein portions (18) of expandable graphite are contained at least in one of the cartridges (2, 3), wherein a length of the mixing nozzle exceeds a length of the cartridges and wherein length of the mixing nozzle (9) in a region of a mixing zone (16) corresponds to between 10 to 20 times a diameter of a mixing nozzle tube (14).

2. Cartridge set according to claim 1, wherein the portions (18) of the expandable graphite are accommodated in the one cartridge (2) containing the polyol as an embedding substance.

3. Cartridge set according to claim 1, wherein the portions (18) of expandable the graphite are accommodated in the other cartridge (3) containing the isocyanate as an embedding substance.

4. Cartridge set according to claim 1, wherein the portions (18) of expandable the graphite are added to the substances such that they are distributed between the two cartridges (2, 3).

5. Cartridge set according to claim 1, wherein a uniform distribution between the substances of the two cartridges (2, 3).

6. Cartridge set according to claim 1, wherein the graphite portions (18) have a longest extent of approximately 0.1 mm to 0.3 mm.

7. Cartridge that according to claim 1, wherein an outlet nozzle cross-section of the mixing nozzle (9) has a diameter of 2 mm to 5 mm.

8. Cartridge set according to claim 1, wherein approximately 40 graphite portions (18) occur on 1 $cm^2$ of surface of the foam (S) or a like cross-sectional area.

9. Cartridge set according to claim 1, wherein a proportion of the graphite with respect to an embedding substance is 10–20%.

10. Cartridge set according to claim 1, further comprising a spiral extending over an entire length of said mixing zone.

11. Cartridge set according to claim 1, wherein the expandable graphite is activated at substantially 200° C.

12. Cartridge set according to claim 1, wherein the expandable graphite attains a maximum value at substantially 900° C., wherein upon attaining the maximum value, the expandable graphite has a volume 280 times that of an initial volume.

* * * * *